Dec. 13, 1960   E. G. OPSAHL ET AL   2,963,989
TRAILER SUPPORT ARRANGEMENT
Filed May 5, 1955   3 Sheets—Sheet 1
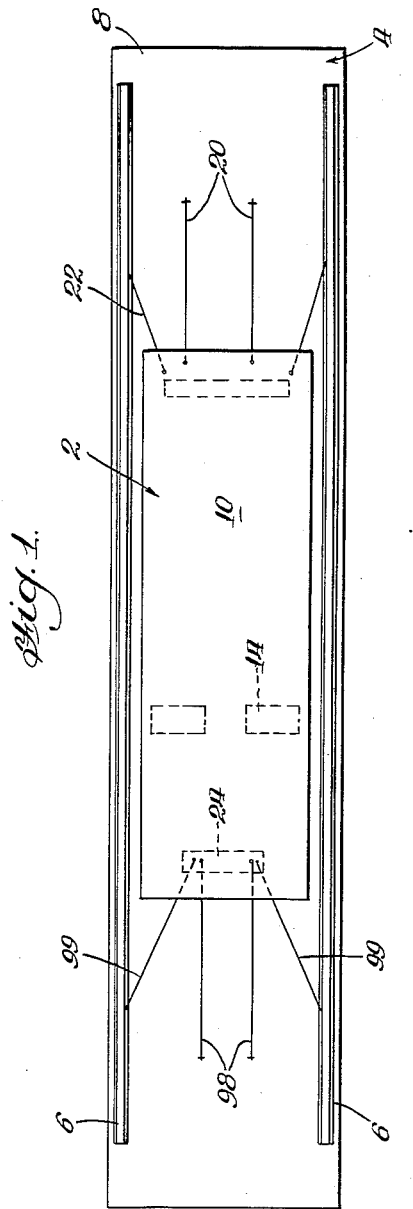
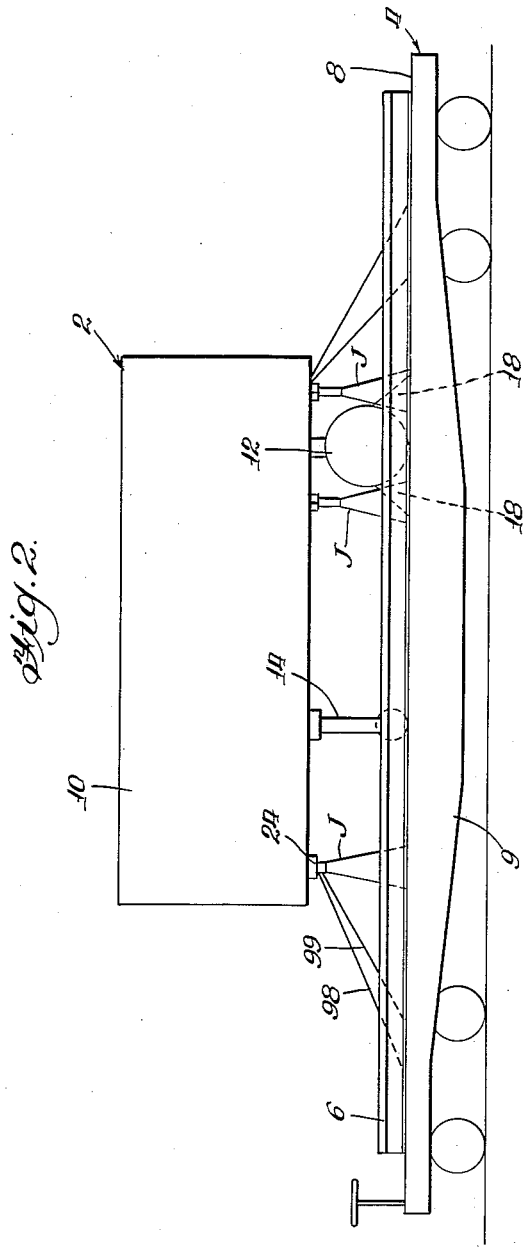
INVENTORS.
Eugene G. Opsahl
Lester E. Robinson
By Walter L. Schlegel, Jr.   Atty.

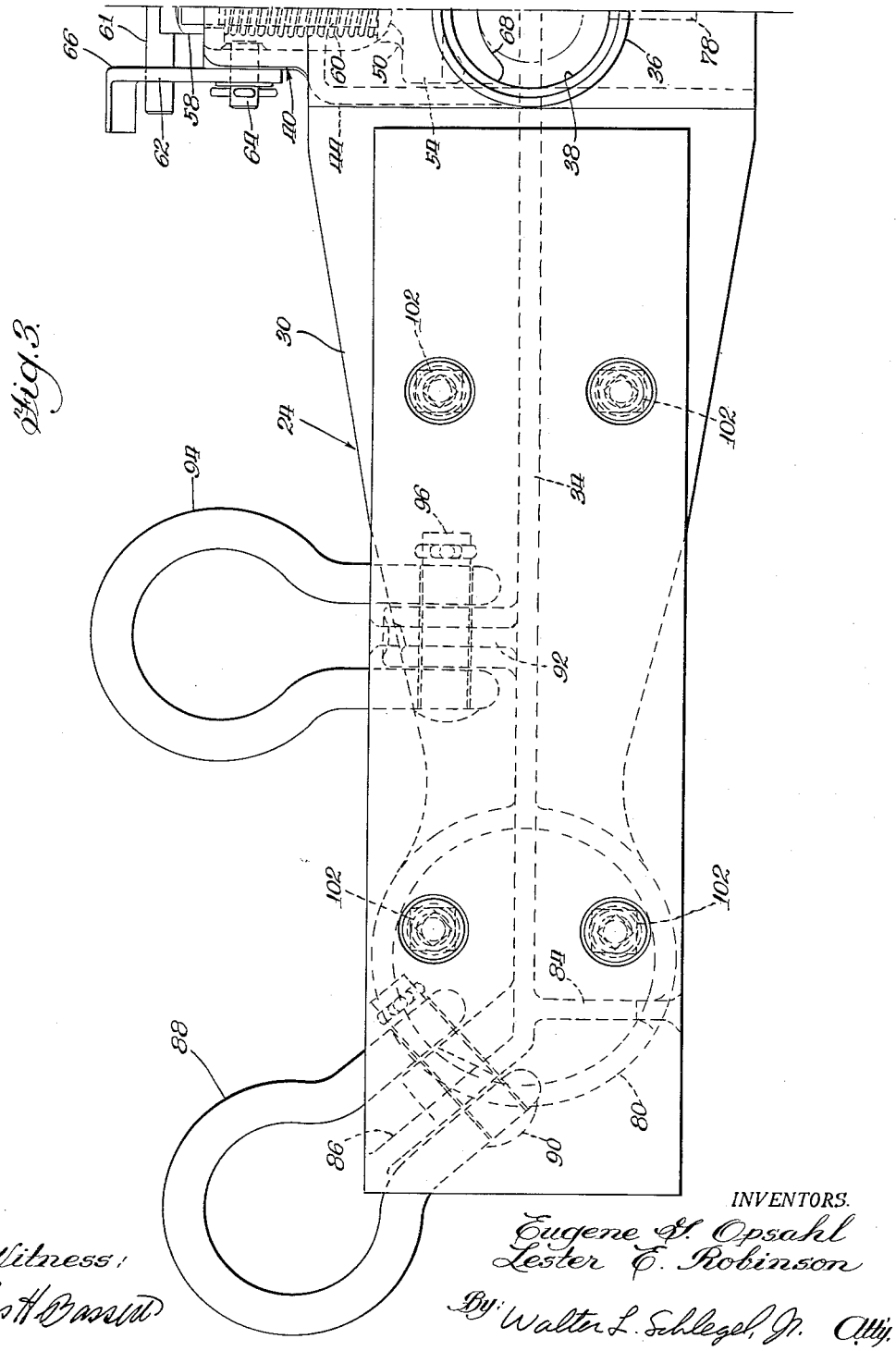

Dec. 13, 1960  E. G. OPSAHL ET AL  2,963,989
TRAILER SUPPORT ARRANGEMENT
Filed May 5, 1955  3 Sheets-Sheet 3
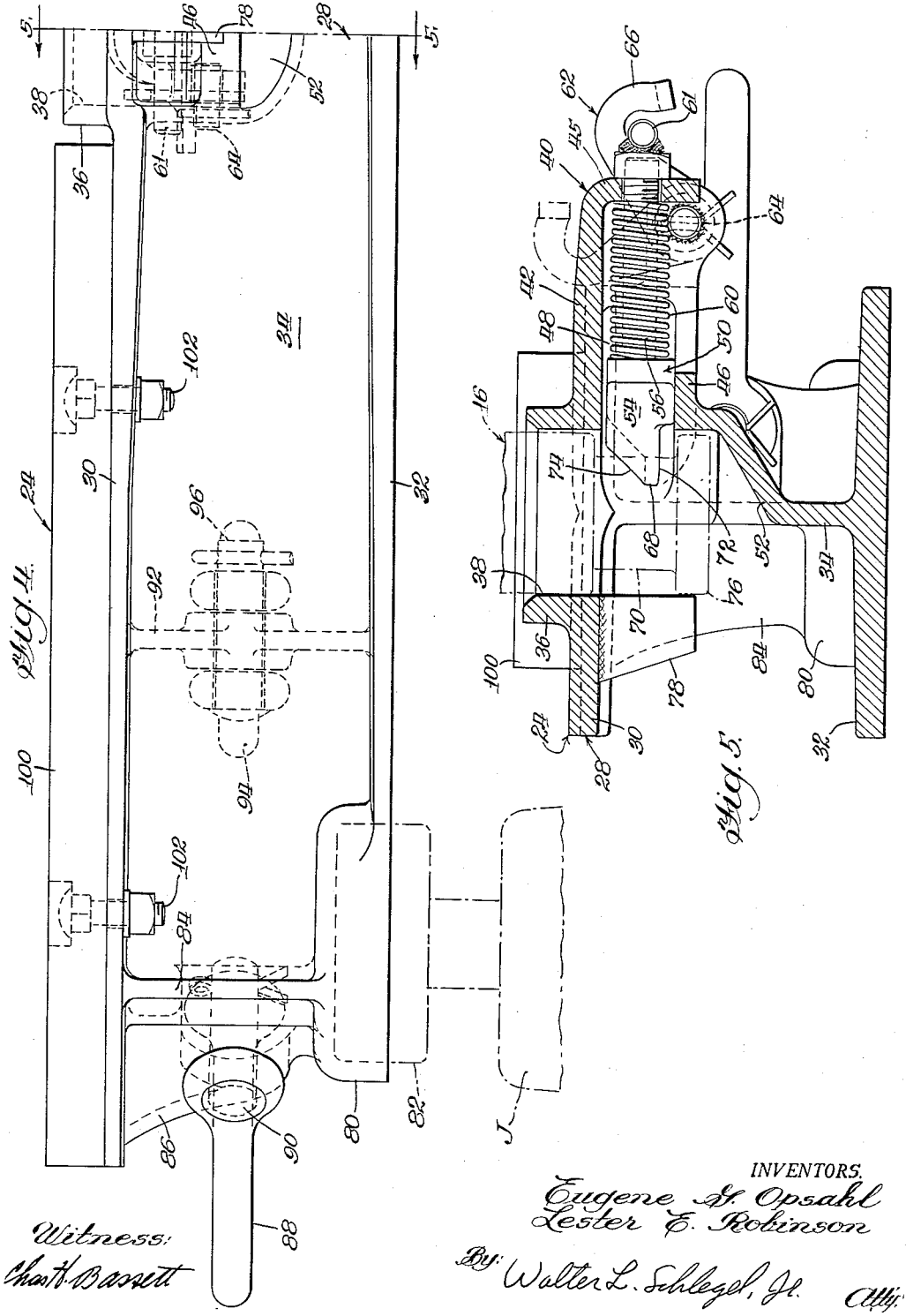
INVENTORS.
Eugene G. Opsahl
Lester E. Robinson
By Walter L. Schlegel, Jr.
Atty.
Witness:
Chas. H. Bassett

United States Patent Office 2,963,989
Patented Dec. 13, 1960

2,963,989
TRAILER SUPPORT ARRANGEMENT

Eugene G. Opsahl, Park Forest, and Lester E. Robinson, Wood Dale, Ill., assignors of one-half to American Steel Foundries, Chicago, Ill., a corporation of New Jersey, and one-half to The Rail-Trailer Co., Chicago, Ill., a corporation of Delaware Filed May 5, 1955, Ser. No. 506,234

2 Claims. (Cl. 105—368)

This invention relates to railway conveyances for transporting highway trailers and more particularly to means adapted for use on such a conveyance for supporting the front end of a highway trailer.

While a conventional highway trailer is provided with a landing gear to support the front end of the trailer when a tractor is removed therefrom, such gear is not designed or adapted for use in supporting the front end of a loaded trailer while the latter is being transported on railway conveyances. It is, therefore, an object of the invention to provide a railway conveyance with means particularly suitable for use in supporting the front end of a trailer during transport of the latter from city to city.

Another object of the invention resides in the provision of a trailer support means comprising a support beam adapted to be detachably connected to a trailer king pin, the ends of the beam being supported upon jacks.

A further object of the invention resides in the provision of a trailer support beam embodying simple and reliable means for detachably securing the beam to a trailer king pin.

Another object of the invention resides in the provision of a support beam provided with clevises to be engaged by tie-down chains secured to the railway conveyance.

The invention embodies other novel features, details of construction and arrangement of parts which are hereinafter set forth in the specification and claims, and illustrated in the accompanying drawings, wherein:

Figure 1 is a top plan view illustrating a railway conveyance having a highway trailer secured thereon by means embodying features of the invention;

Figure 2 is a side elevational view of same;

Figure 3 is a top plan view illustrating a support beam assembly, only half of the beam being shown as it is symmetrical about its transverse center line;

Figure 4 is a rear elevational view of same;

Figure 5 is a transverse sectional view taken along the line 5—5 of Figure 4.

Referring now to Figures 1 and 2 in the drawings for a better understanding of the invention, a conventional highway trailer 2 is shown as mounted for transport upon a railway flat car 4 having steel side rails 6—6 secured to the floor 8 or bolted to the car frame 9. The highway trailer is shown as comprising a body 10 supported at one end thereof upon rear wheels 12 and at the other end upon a landing gear 14. The trailer body is also provided with the usual king pin 16 for detachable engagement with a conventional fifth wheel (not shown) of a highway tractor.

To secure the trailer for transport on the flat car, sets of chock blocks 18—18, interconnected by tie rods (not shown), are mounted on the floor 8 of the flat car to engage the front and rear sides of the wheel 12. The back end of the trailer body 10 is connected to the floor 8 by means of tie-down chains 20—20, and is also connected to the side rails 6—6 by means of diagonal tie-down chains 22—22.

The front end of the trailer body 10 is supported upon a beam assembly 24 mounted at its ends upon a pair of jacks J. The beam assembly 24 is shown as comprising a cast steel beam 28 of generally H section to provide upper and lower flanges 30 and 32, respectively, joined by a central web 34, the flanges being of gradually decreasing width from the center of the beam toward the ends thereof. The medial portion of the upper flange 30 is formed with an annular bearing flange 36, said flanges being bored at 38 to receive the lower end of the trailer king pin 16, as illustrated in Figure 5 in the drawings.

The beam 28 is formed with a latch bolt housing 40 having a top wall 42, side walls 44, an end wall 45 and a bottom wall 46, said walls defining a pocket 48 extending radially from the axis of the bore 38 to receive a latch bolt 50 for reciprocative movement. An arcuate diagonal web 52 projects upwardly and forwardly from the central web 34 to merge with the inner end of the bottom wall 46.

The latch bolt 50 is shown as comprising a head 54 provided on the inner end of a shank 56 having a threaded outer end projecting through the end wall 45 to receive a nut 58. A helical compression spring 60 is sleeved over the shank 56 and interposed between the head 54 and end wall 45 to yieldably resist outward movement of the latch bolt 50. A length of steel rod is welded to the nut 58 and outer end of the shank 56 to serve as a handle 61 adapted to be manually engaged to move the latch bolt 50 out of engagement with the king pin 16. A latch 62 is journaled on a pivot pin 64 welded on a side wall 44 of the housing 40 and has a hook-shape outer end 66 movable into and out of locking engagement with the handle 61.

The front end of the latch bolt head 54 is formed with an arcuate lip 68, as viewed in plan, for engagement within an annular locking recess 70 formed on the lower end of the king pin 16. The lip 68 is shown as being wedge-shape in side elevation to provide a horizontal lower abutment surface 72 and an inclined upper cam surface 74. As illustrated in Figure 5, the cam surface 74 is engaged by the abutment flange 76 on the lower end of the king pin 16 to retract the latch bolt during mounting of the beam on the king pin; after which displacement of the beam from the king pin is prevented by engagement of the abutment surface 72 against the abutment flange 76.

An abutment plate 78 is welded to and depends downwardly from the upper flange 30 for abutting engagement against the side of the annular abutment flange 76 remote from bottom wall 46 of the housing, said plate and wall serving to limit rotational movement of the beam 28 about its long axis after mounting of the beam on the king pin.

Cup-shape caps 80—80 are provided at opposite ends of the beam to receive the heads 82 of jacks J, the walls of each cap merging with the lower flange 32, central web 34, a reinforming web 84 and a diagonal clevis supporting web 86. Each diagonal clevis supporting web also merges with the upper flange 30 and an outer end of the central web. A clevis 88 straddles each diagonal web 86 and is pivotally connected thereto by means of a pivot pin 90.

The beam 28 is also provided with transverse clevis supporting webs 92—92 spaced inwardly from the ends of the beam and having clevises 94—94 pivotally mounted thereon by means of pins 96—96, said webs merging with the upper and lower flanges 30 and 32 and the central web 34. Tie-down chains 98—98 connect the clevises 94—94 to the car floor or frame; and tie-down chains 99—99 connect the diagonal clevises 88—88 to their respective side rails 6—6.

Identical wooden facings 100—100 are secured to the upper flange 30 of the beam by means of bolts 102 to engage the underside of the trailer body 10, the upper surfaces of said facings being disposed in a common plane spaced slightly above the upper end of the annular bearing flange 36.

In the transportation of highway trailers 2 on railway flat cars 4, the trailers are drawn up a suitable ramp (not shown) onto the car by means of a conventional highway tractor connected to the king pin 16 by means of a fifth wheel. After the landing gear 14 is lowered to support the front end of the trailer, the tractor is disconnected from the trailer and removed from the flat car. The rear wheels 12 are engaged by the chock blocks 18, and the back end of the trailer body is secured to the car floor or frame and also to the side rails 6—6 by means of the tie-down chains 20—20 and 22—22, respectively. If desired, jacks J may be interposed between the car floor and trailer body to remove part of the load from the trailer springs.

The support beam 28 is manually positioned transversely of the trailer and then raised to mount the king pin 16 in the bore 38. As the pin passes through the bore, the latch bolt 50 is first moved outwardly by sliding engagement of the annular abutment flange 76 along the cam surface 74, and is then moved inwardly by the spring 60 to engage the flange under the abutment surface 72. The support beam 28 and the front end of the trailer are then raised slightly by the jacks J which have their heads 82 engaged within the caps 80—80, thus removing the load from the landing gear 14. The tie-down chains 98—98 and 99—99 are then secured to the clevises 94—94 and 88—88, respectively, to connect the support beam to the car floor and side rails, respectively.

Each of the tie-down chains is provided with a conventional turnbuckle (not shown) whereby the length of the chains may be decreased to thus place the chains under uniform tension. After the beam has been mounted on the king pin 16, the latch 62 is adapted to be pivoted into engagement with the handle 61 to prevent accidental outward movement of the latch bolt 50.

We claim:

1. An independent detachable beam for use in supporting on a railway flatcar a highway trailer having a depending king pin with a head adjacent its lower end, said beam being elongated and having intermediate its ends an opening extending vertically therethrough to define a king pin receiving socket with an uninterrupted periphery which will permit entry of the king pin only by vertical movement of the king pin into the socket, said beam having at said socket integral retaining means engageable with the king pin head after vertical entry of the king pin into the socket to retain the king pin within the socket and to permit the beam to be suspended from the king pin during application of the beam to the trailer and to limit upward movement of the trailer from the beam after application of the latter to the former.

2. An independant detachable beam according to claim 1, wherein said integral retaining means comprises a spring actuated latch mechanism having a portion moveable into said socket for engagement with said king pin head.

References Cited in the file of this patent

UNITED STATES PATENTS

| | | |
|---|---|---|
| 1,324,777 | Barber | Dec. 16, 1919 |
| 1,664,224 | Pinckney | Mar. 27, 1928 |
| 2,036,344 | Menhall | Apr. 7, 1936 |
| 2,099,288 | Allen | Nov. 16, 1937 |
| 2,159,479 | Goodwin et al. | May 23, 1939 |